US011167316B2

(12) United States Patent
Bowen

(10) Patent No.: US 11,167,316 B2
(45) Date of Patent: Nov. 9, 2021

(54) VIBRATORY SEPARATOR WITH A SLOPED RAMP

(71) Applicant: M-I L.L.C., Houston, TX (US)

(72) Inventor: Charles Bowen, Florence, KY (US)

(73) Assignee: Schlumberger Technology Corporation, Sugar Land, TX (US)

( * ) Notice: Subject to any disclaimer, the term of this patent is extended or adjusted under 35 U.S.C. 154(b) by 3 days.

(21) Appl. No.: 16/709,784

(22) Filed: Dec. 10, 2019

(65) Prior Publication Data

US 2021/0170449 A1 Jun. 10, 2021

(51) Int. Cl.
*B07B 1/36* (2006.01)

(52) U.S. Cl.
CPC ..................... *B07B 1/36* (2013.01)

(58) Field of Classification Search
CPC .................... B07B 1/36; B07B 1/06
See application file for complete search history.

(56) References Cited

U.S. PATENT DOCUMENTS

| | | | | |
|---|---|---|---|---|
| 279,286 A * | 6/1883 | Sutton | ............... | B07B 1/15 209/279 |
| 3,108,949 A * | 10/1963 | Fehlmann | ............... | B07B 1/06 209/36 |
| 3,501,002 A * | 3/1970 | Talley, Jr. | ............... | B07B 1/38 209/240 |
| 3,504,793 A * | 4/1970 | More | ............... | B07B 1/08 209/255 |
| 4,319,991 A * | 3/1982 | Crone, Jr. | ............... | B07B 1/06 209/255 |
| 5,382,370 A * | 1/1995 | Jones | ............... | B01D 33/56 210/781 |
| 5,401,407 A * | 3/1995 | Jones | ............... | B07B 13/16 210/369 |
| 6,096,210 A | 8/2000 | Hazrati et al. | | |
| 2009/0071878 A1 | 3/2009 | Bosse | | |
| 2016/0288170 A1 | 10/2016 | Alamzad et al. | | |

FOREIGN PATENT DOCUMENTS

EP 0419033 A1 3/1991

OTHER PUBLICATIONS

Search Report and Written Opinion of International Patent Application No. PCT/US2020/056413 dated Apr. 14, 2021; 11 pages.

* cited by examiner

*Primary Examiner* — Patrick H Mackey
(74) *Attorney, Agent, or Firm* — Jeffrey D. Frantz

(57) ABSTRACT

A frame assembly for a vibratory separator includes a screen and a pan positioned at least partially below the screen. The frame assembly also includes a ramp positioned at least partially below the screen and at least partially around the pan. The ramp defines an opening therethrough. The pan extends at least partially through the opening of the ramp. The ramp is tilted with respect to horizontal.

17 Claims, 7 Drawing Sheets

VIBRATORY SEPARATOR WITH A SLOPED RAMP

BACKGROUND

Vibratory separators are used to separate solids from fluids and/or to separate solids of different sizes from one another. For example, in the food industry, vibratory separators may be used to separate large chips (e.g., potato chips) from small chips. However, when the rate of chips introduced into a conventional separator is greater than a predetermined threshold, the separator may become clogged. In addition, when the ratio of large chips to small chips is too large or too small, the separator may become clogged.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

A frame assembly for a vibratory separator is disclosed. The frame assembly includes a screen and a pan positioned at least partially below the screen. The frame assembly also includes a ramp positioned at least partially below the screen and at least partially around the pan. The ramp defines an opening therethrough. The pan extends at least partially through the opening of the ramp. The ramp is tilted with respect to horizontal.

A vibratory separator is also disclosed. The vibratory separator includes an upper frame assembly. The upper frame assembly includes a screen configured to receive a feed material. A first portion of the feed material passes through the screen, and a second portion of the feed material falls over an outer edge of the screen. The upper frame assembly also includes a pan positioned at least partially below the screen. The first portion of the feed material falls into the pan after passing through the screen. The first portion of the feed material exits the vibratory separator via a lower spout outlet subsequent to falling into the pan. The upper frame assembly also includes a ramp positioned at least partially below the screen and at least partially around the pan. The ramp defines an opening therethrough. The pan extends at least partially through the opening of the ramp. The ramp is tilted at an angle from about 5° to about 30° with respect to the outer edge of the screen such that the ramp includes an upper side and a lower side. The upper frame assembly also includes an inner frame wall positioned radially outward from the pan. The upper frame assembly also includes an outer frame wall positioned radially outward from the screen, the pan, the ramp, and the inner wall. The inner frame wall, the ramp, and the outer wall at least partially define a channel. The second portion of the feed material falls over the outer edge of the screen into the channel. The second portion of the feed material exits the vibratory separator via an upper spout outlet subsequent to falling into the channel.

A method for using a vibratory separator is also disclosed. The method includes receiving a feed material on a screen of an upper frame assembly. The method also includes separating the feed material into a first portion and a second portion. The first portion falls through the screen into a pan, and the second portion falls over an outer edge of the screen onto a ramp. The ramp defines an opening therethrough. The pan extends at least partially through the opening of the ramp. The ramp is tilted with respect to horizontal. The method also includes directing the first portion toward a first spout outlet subsequent to falling into the pan. The method also includes directing the second portion toward a second spout outlet subsequent to falling onto the ramp.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Illustrative examples of the subject matter claimed below will now be disclosed. In the interest of clarity, not all features of an actual implementation are described in this specification. It will be appreciated that in the development of any such actual implementation, numerous implementation-specific decisions may be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Further, as used herein, the article "a" is intended to have its ordinary meaning in the patent arts, namely "one or more." Herein, the term "about" when applied to a value generally means within the tolerance range of the equipment used to produce the value, or in some examples, means plus or minus 10%, or plus or minus 5%, or plus or minus 1%, unless otherwise expressly specified. Further, herein the term "substantially" as used herein means a majority, or almost all, or all, or an amount with a range of about 51% to about 100%, for example. Moreover, examples herein are intended to be illustrative only and are presented for discussion purposes and not by way of limitation.

Figure 1:
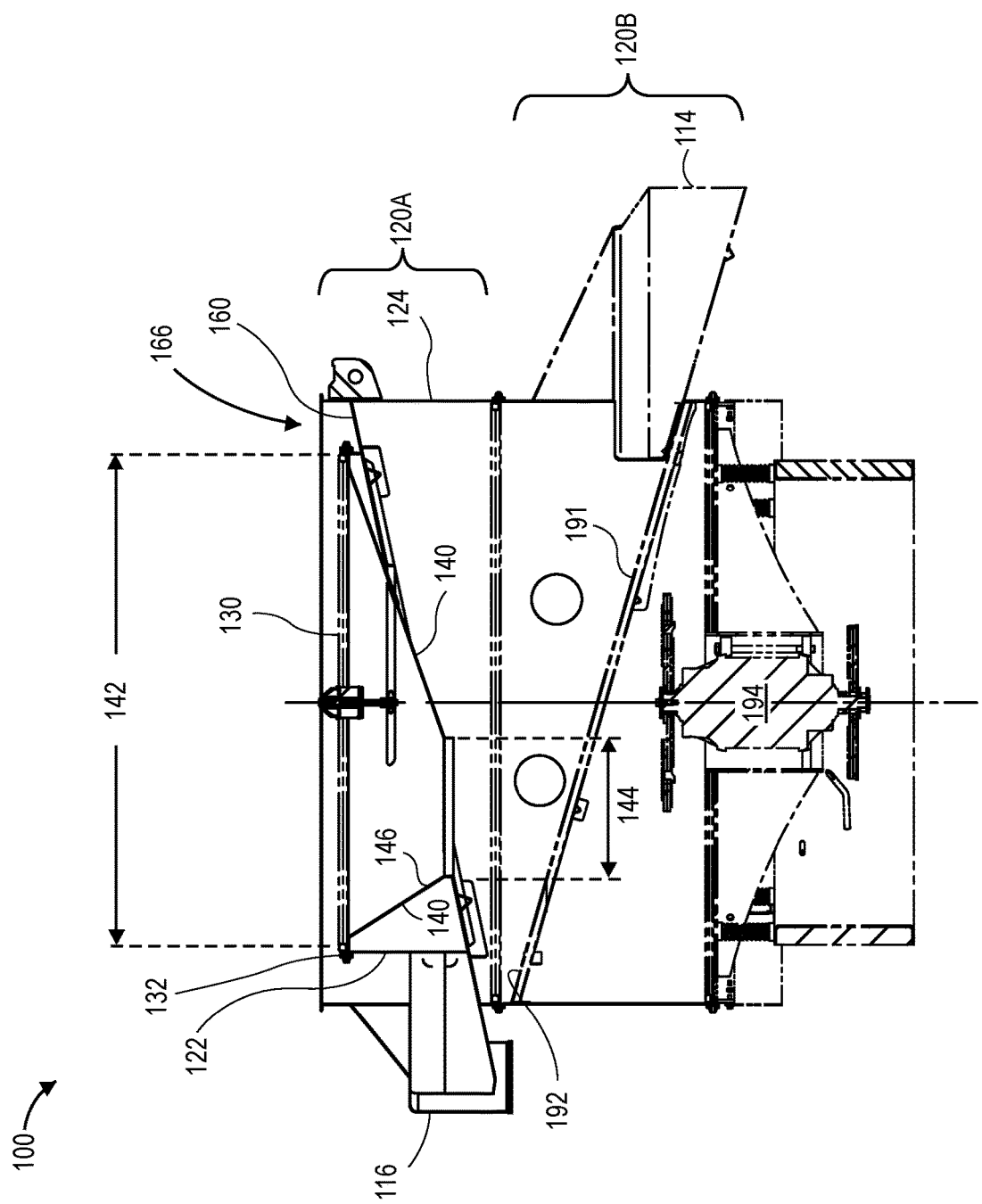
FIG. 1 illustrates a cross-sectional side view of an example of a vibratory separator, according to an embodiment.

FIG. 1 illustrates a cross-sectional side view of an example of a vibratory separator 100, according to an embodiment. The vibratory separator 100 may be used in the food industry, the oil and gas industry, the chemical industry, etc. to separate solids from fluids and/or to separate solids of different sizes from one another. In the example described below, the vibratory separator 100 is configured to separate a solid feed material by size. More particularly, the vibratory separator 100 is configured to separate objects in the feed material that are larger than a predetermined size from objects in the feed material that are smaller than the predetermined size. In one particular example, the feed material may be or include chips (e.g., potato chips).

The vibratory separator 100 may include an upper frame assembly 120A. The upper frame assembly 120A may include an inner frame wall 122 and an outer frame wall 124. The inner frame wall 122 and the outer frame wall 124 may be substantially circular, and the inner frame wall 122 may be positioned radially inward from the outer frame wall 124. In one example, the inner frame wall 122 and the outer frame wall 124 may be concentric. The inner frame wall 122 and/or the outer frame wall 124 may be substantially vertical.

The upper frame assembly 120A may also include a screen (also referred to as a screen element) 130. The screen 130 may be positioned at least partially within the inner frame wall 122 and/or the outer frame wall 124. More particularly, an outer edge 132 of the screen 130 may be substantially aligned with the inner frame wall 122. In one example, the outer edge 132 of the screen 130 may be coupled to an upper surface of the inner frame wall 122. The screen 130 may be or include a wire mesh stretched over a frame. As described in greater detail below, the feed material may be introduced onto a center portion of the screen 130. The screen 130 (e.g., the wire mesh) may have a plurality of openings formed therethrough. The openings may be sized to separate the feed material. More particularly, a first portion of the feed material (e.g., the liquid and/or small objects) may pass through the screen 130, and a second portion of the feed material (e.g., the large objects) may not pass through the screen 130. In the embodiment described herein, where the feed material is chips, the openings may have a cross-sectional length from about 1 inch to about 2.5 inches or about 1.5 inches to about 2 inches.

The upper frame assembly 120A may also include a drop-in pan 140. The pan 140 may be positioned at least partially within the inner frame wall 122. The pan 140 may be positioned below the screen 130. The pan 140 may include or define an upper opening 142 and a lower opening 144. The pan 140 may also include an inner surface 146 between the upper and lower openings 142, 144. The inner surface 146 may be sloped downward such that the pan 140 and/or the inner surface 146 may be at least partially circular, partially conical, or partially frustoconical. The pan 140 may be rotated (e.g., turned) into any desired position at least partially within the inner frame wall 122 such that the pan 140 extends vertically downward.

The upper frame assembly 120A may also include a ramp (also referred to herein as a trough) 160. The ramp 160 may be positioned (e.g., radially) between the inner frame wall 122 and the outer frame wall 124. As shown, the ramp 160 may be sloped (e.g., tilted). A channel 166 may be defined at least partially by/between the inner frame wall 122, the outer frame wall 124, and the ramp 160. In at least one embodiment, the upper frame assembly 120A, including the inner frame wall 122, the outer frame wall 124, the screen 130, the pan 140, the ramp 160, or a combination thereof may be a single (e.g., integral) component.

The vibratory separator 100 may also include a lower frame assembly 120B positioned at least partially below the upper frame assembly 120A. The lower frame assembly 120B may include a sloped tray 191.

The vibratory separator 100 may also include a motion generator 194. The motion generator 194 may be positioned at least partially within the lower frame assembly 120B or below the lower frame assembly 120B. The motion generator 194 may be configured to impart motion to the upper frame assembly 120A and/or the lower frame assembly 120B. More particularly, the motion generator may be configured to impart motion to the screen 130, the pan 140, the ramp 160, the sloped tray 191, the feed material, or a combination thereof.

The feed material may be introduced onto a center portion of the screen 130. The motion from the motion generator 194 may cause the screen 130 to vibrate, which may cause the feed material to move radially outward on the screen 130 (e.g., toward the outer edge 132). In one embodiment, the motion may cause the feed material to move in a spiral pattern on the screen 130 (e.g., toward the outer edge 132). As the feed material moves on the screen 130, the liquid and/or small objects in the feed material may pass through the openings in the screen 130 and land on the inner surface 146 of the pan 140. The liquid and/or small objects may then slide down the inner surface 146 of the pan 140 and fall through the lower opening 144 of the pan 140 into the lower frame assembly 120B. More particularly, the liquid and/or small objects may fall onto the sloped tray 191 in the lower frame assembly 120B. The liquid and/or small objects may then slide down the sloped tray 191 and exit the lower frame assembly 120B through a lower spout outlet 114. The lower spout outlet 114 may be part of or coupled to the lower frame assembly 120B.

The large objects in the feed material that are unable to pass through the openings in the screen 130 may fall over the outer edge 132 of the screen 130 onto the ramp 160. The large objects may then slide down the ramp 160 and exit the upper frame assembly 120A through an upper spout outlet 116. The upper spout outlet 116 may be part of or coupled to the upper frame assembly 120A. In the embodiment shown, the spout outlets 114, 116 are circumferentially offset from one another (e.g., by about 180°). In another embodiment, the spout outlets 114, 116 may be circumferentially aligned (e.g., with one above the other).

Figure 2:
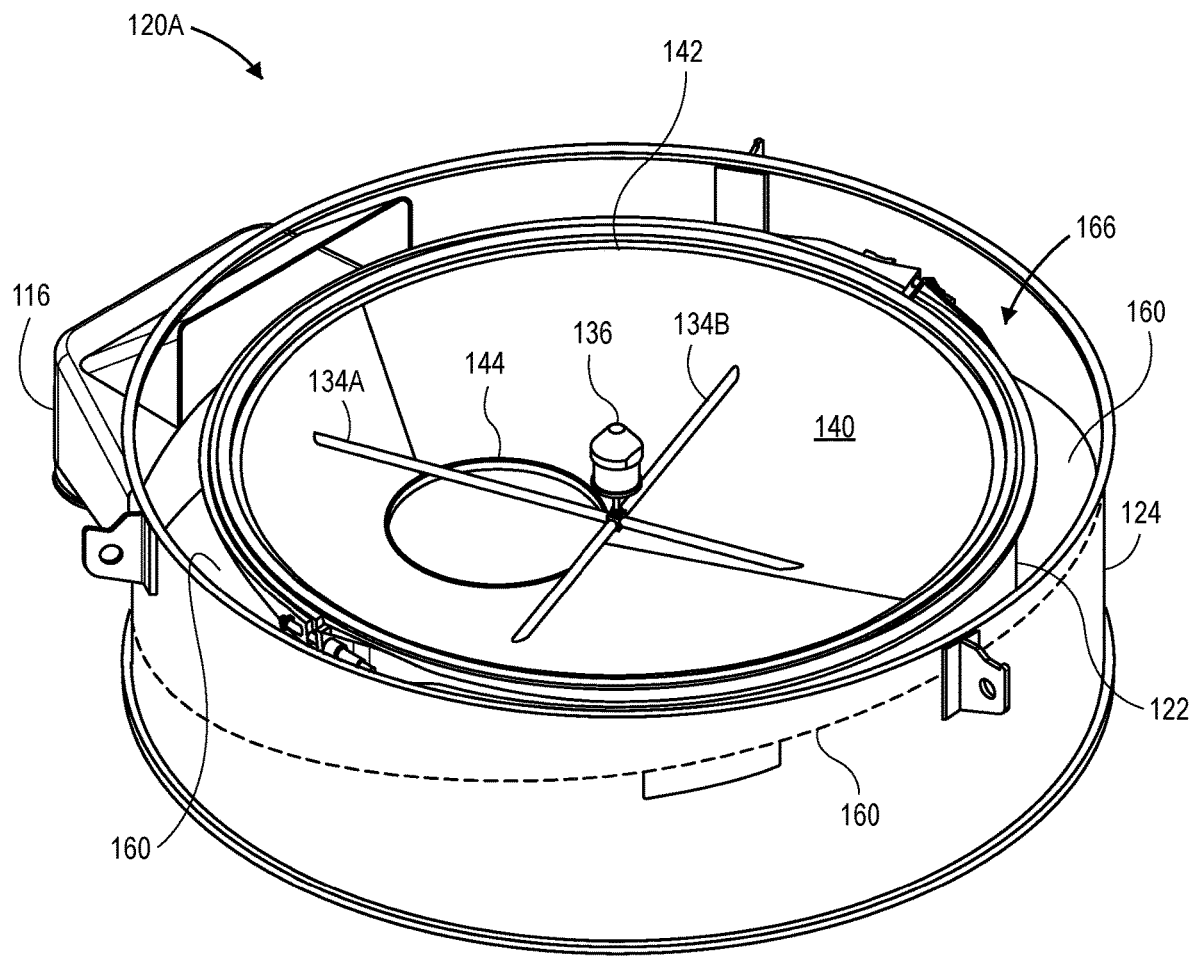
FIG. 2 illustrates a top perspective view of an upper frame assembly of the vibratory separator, according to an embodiment.

FIG. 2 illustrates a top perspective view of the upper frame assembly 120A, according to an embodiment. As mentioned above, the upper frame assembly 120A may include the inner frame wall 122, the outer frame wall 124, screen 130, the pan 140, and/or the ramp 160. The screen 130 has been omitted in FIG. 2 for clarity. The upper opening 142 of the pan 140 may be larger than the lower opening 144 of the pan 140. In addition, the pan 140 may be or include an offset configuration whereby the lower opening 144 is misaligned (e.g., not concentric) with the upper opening 142. In other words, the upper opening 142 may have a different center point (or central axis) than the lower opening 144.

The upper frame assembly 120A may also include one or more screen support members (two are shown: 134A, 134B). The screen support members 134A, 134B may be positioned below the screen 130 and at least partially within the pan 140. The screen support members 134A, 134B may be coupled to the pan 140 and/or extend at least partially through the pan 140. As shown, the screen support members 134A, 134B may be substantially perpendicular to one another.

A screen center support 136 may be coupled to one or both screen support members 134A, 134B. The screen center support 136 may be positioned above the screen support members 134A, 134B. Although the screen 130 is not shown in FIG. 2 for clarity, the screen center support 136 may exert an upward force on a center portion of the screen 130, which may cause the center portion of the screen 130 to be higher than the outer edge 132 of the screen 130. Thus, the screen 130 may be substantially dome-shaped. This dome-shape, in combination with the motion from the motion generator 194, may facilitate the movement of the large objects radially outward on the screen 130.

Figure 3:
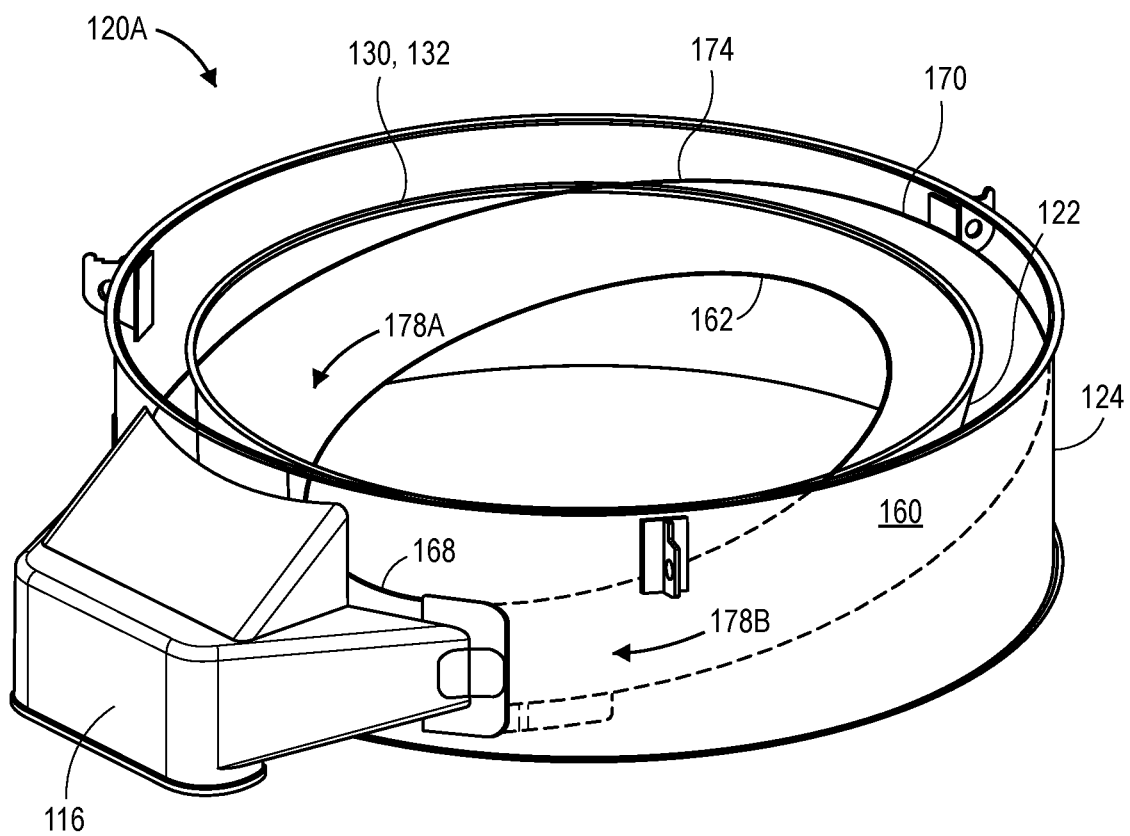
FIG. 3 illustrates another top perspective view of the upper frame assembly with a drop-in pan removed for clarity, according to an embodiment.

FIG. 3 illustrates another top perspective view of the upper frame assembly 120A with an inner portion of the screen 130 and the pan 140 removed for clarity, according to an embodiment. The ramp 160 may be sloped (e.g., tilted) at an angle from about 5° to about 30° or about 10° to about 20° with respect to a horizontal plane (e.g., that extends through the outer edge 132 of the screen 130). Thus, the ramp 160 may have a lower side 168 proximate to the lower spout outlet 116 and an upper side 170 distal to the spout outlet 116. Due to the ramp 160 being sloped, the ramp 160 may be substantially elliptical. For example, an outer edge 174 of the ramp 160 may be substantially elliptical to contact the inner surface of the outer frame wall 124. The large objects in the feed material may fall over the outer edge 132 of the screen 130 at any location along the 360° of the circumference of the screen 130 onto the ramp 160. The large objects may then slide down the ramp 160 toward the spout outlet 116. The ramp 160 may also define an opening 162 therethrough. Although not shown in this view, the pan 140 may extend at least partially through the opening 162.

Figure 4:
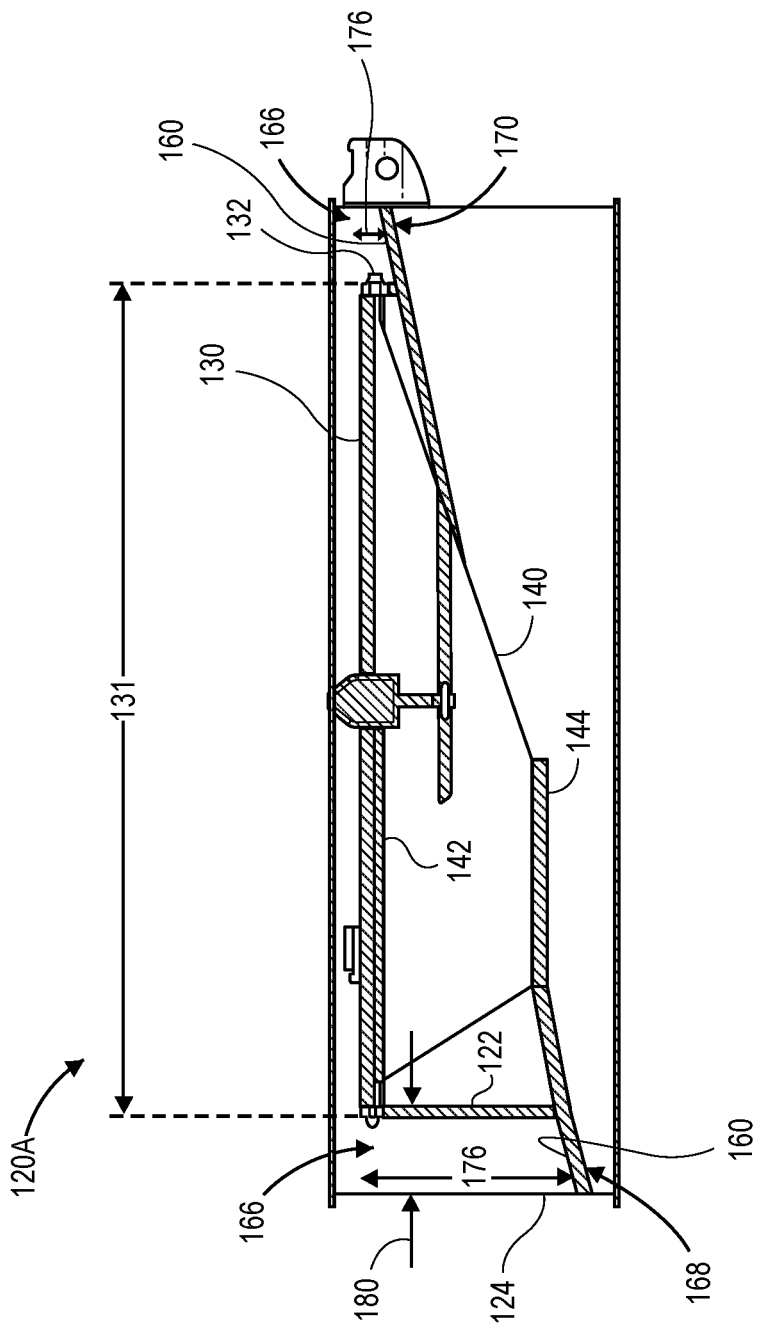
FIG. 4 illustrates a cross-sectional side view of a portion of the upper frame assembly, according to an embodiment.

FIG. 4 illustrates a cross-sectional side view of a portion of the upper frame assembly 120A, according to an embodiment. The outer edge 132 of the screen 130 may be in a substantially horizontal plane. As a result, a depth 176 of the channel 166 may vary around the circumference of the screen 130 and/or the ramp 160. The depth 176 may include the vertical distance from the screen 130 to the ramp 160. This represents the distance that the large objects of the feed material may fall from the screen 130 onto the ramp 160. A maximum depth between the screen 130 and the ramp 160 may be proximate to the lower side 168 of the ramp 160, and a minimum depth between the screen 130 and the ramp 160 may be proximate to the upper side 170 of the ramp 160. As used in this instance, "proximate to" refers to being positioned at (or next to) a particular circumferential location (e.g., the circumferential location that includes the lower side 168 and/or the upper side 170). The maximum depth may be from about 22 cm to about 46 cm, and the minimum depth may be from about 3.8 cm to about 11.4 cm. Referring to FIGS. 3 and 4, the depth 176 may progressively increase through first and second paths 178A, 178B, which extend around opposing sides of the inner frame wall 122, between the upper side 170 and the lower side 168.

A width 180 of the channel 166 may be defined between the inner frame wall 122 and the outer frame wall 124. The width 124 may be substantially constant through first and second paths 178A, 178B, which extend around opposing sides of the inner frame wall 122, between the upper side 170 and the lower side 168. In at least one embodiment, a ratio of the width 180 of the channel 166 to a cross-sectional length (e.g., diameter) 131 of the screen 130 may be from about 30 inches to about 60 inches.

The vibratory separator 100 may differ from conventional vibratory separators because the vibratory separator 100 may be able to separate feed materials that range from mostly small objects to mostly large objects and anywhere in between without removing or replacing portions of the vibratory separator 100. As used herein, "mostly small objects" refers to at least 70%, at least 80%, or at least 90% objects that are smaller than the openings in the screen 130 and thus may pass through the screen 130. As used herein, "mostly large objects" refers to at least 70%, at least 80%, or at least 90% objects that are larger than the openings in the screen 130 and thus may not pass through the screen 130 and instead fall over the outer edge 132 of the screen into the channel 166. In either scenario, the vibratory separator 100 may be able to separate and discharge feed materials that are high in volume, light in density, irregularly shaped, sticky, or otherwise difficult to move or convey. This may be due at least in part to the large objects being able to cascade off of the screen 130 around the entire circumference (e.g., 360 degrees) of the screen 130 onto the ramp 160. The ramp 160, which is sloped and vibrating, accelerates the large objects to the upper spout outlet 116 at a high speed, which allows high volumes of feed material of any composition to be processed without clogging the vibratory separator 100.

In contrast, conventional vibratory separators are modified by a user based upon the type of feed material. More particularly, a user may select a different upper frame assembly and/or a different lower frame assembly depending upon the composition of the feed material. For example, if the feed material changes in composition (e.g., to have a greater percentage of large objects), the user may manually replace the upper frame assembly and/or the lower frame assembly with a different frame assembly that is specifically designed/sized to handle mostly large objects. Then, if the feed material changes in composition again (e.g., (e.g., to have a greater percentage of small objects) the user may again manually replace the upper frame assembly and/or the lower frame assembly with a different frame assembly that is specifically designed/sized to handle mostly small objects.

Figure 5:
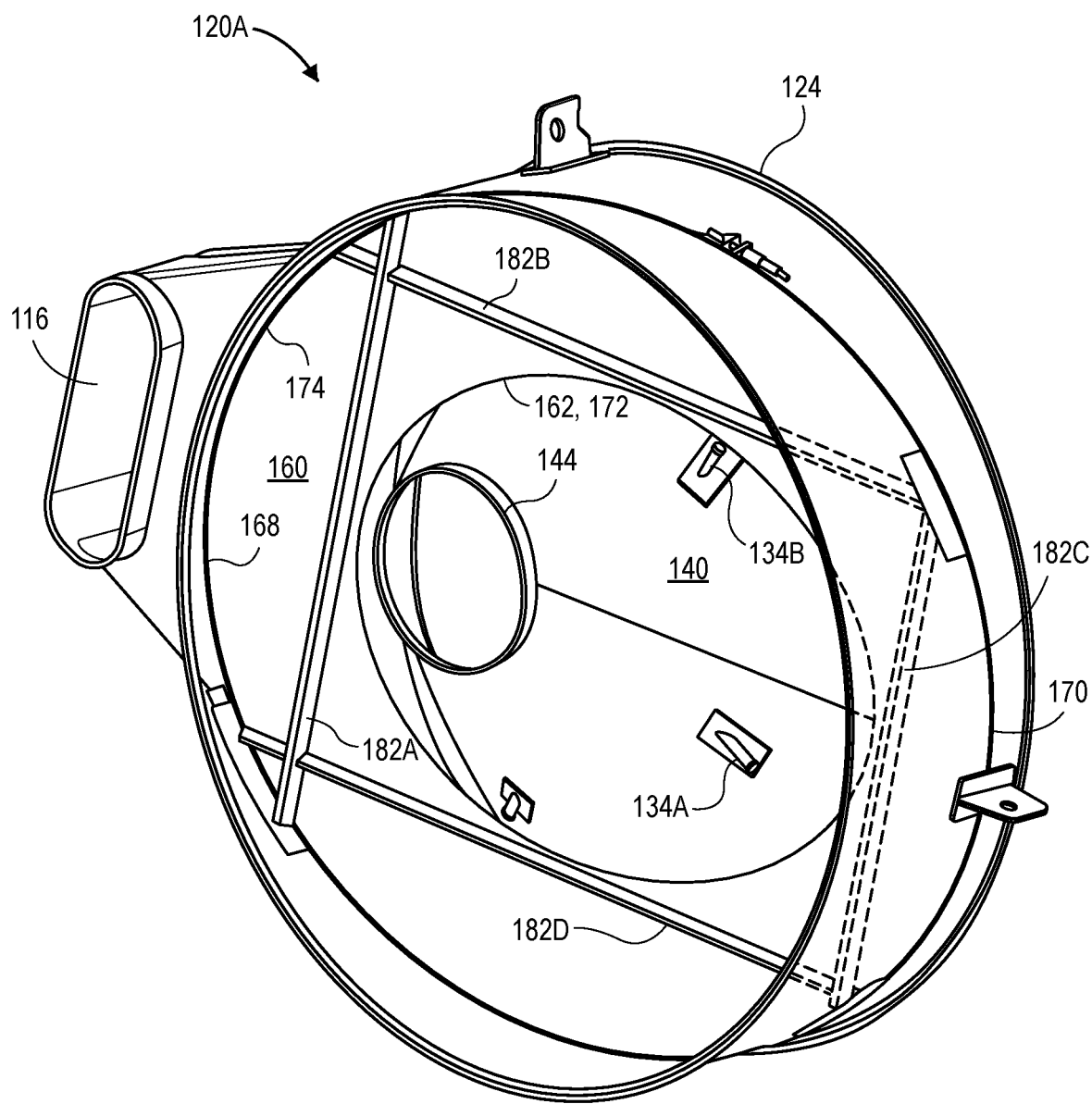
FIG. 5 illustrates a bottom perspective view of the upper frame assembly, according to an embodiment.

FIG. 5 illustrates a bottom perspective view of the upper frame assembly 120A, according to an embodiment. The upper frame assembly 120A may also include one or more ramp support members (four are shown: 182A, 182B, 182C, 182D). The ramp support members 182A-182D may be positioned under the ramp 160 and at least partially within the outer frame wall 124. The ramp support members 182A-182D may be coupled to the outer frame wall 124. The ramp support members 182A-182D may be configured to at least partially support the weight of the ramp 160, the pan 140, the screen 130, the feed material, or a combination thereof. The ramp support members 182A-182D may be oriented in a substantially square or rectangular shape. The ramp support members 182A-182D may not be visible through the opening of the ramp 160 when viewed from above, as shown in FIG. 2. Also, as shown, the screen support members 134A, 134B may extend at least partially through the pan 140.

In addition, as shown in FIG. 5, the pan 140 includes an offset configuration and may be oriented (e.g., rotated during assembly) such that the lower opening 144 is positioned closer to any chosen point of the outer frame wall 124. When processing (e.g., separating) fragile feed materials (e.g., potato chips), the pan 140 may be rotated to minimize the distance that the small objects in the feed material will drop onto the sloped tray 191 to prevent breakage and seasoning fall-off. As shown in FIGS. 1 and 5, the spout outlets 114, 116 are about 180 degrees apart, and the lower opening 144 of the pan 140 may be positioned proximate (e.g., closer) to the upper side 192 of the sloped tray 191. This directs the small objects passing through screen 130 and the pan 140 to the upper side 192 of the sloped tray 191 located in the lower frame assembly 120B. However, the locations of the spout outlets 114, 116 may vary. If spout outlets 114, 116 are not located 180 degrees apart from each other, the pan 140 may be rotated such that the lower opening 144 is positioned proximate to the upper side 192 of the sloped tray 191. This minimizes damage to fragile feed materials from free fall and minimizes any season fall-off.

Figure 6:
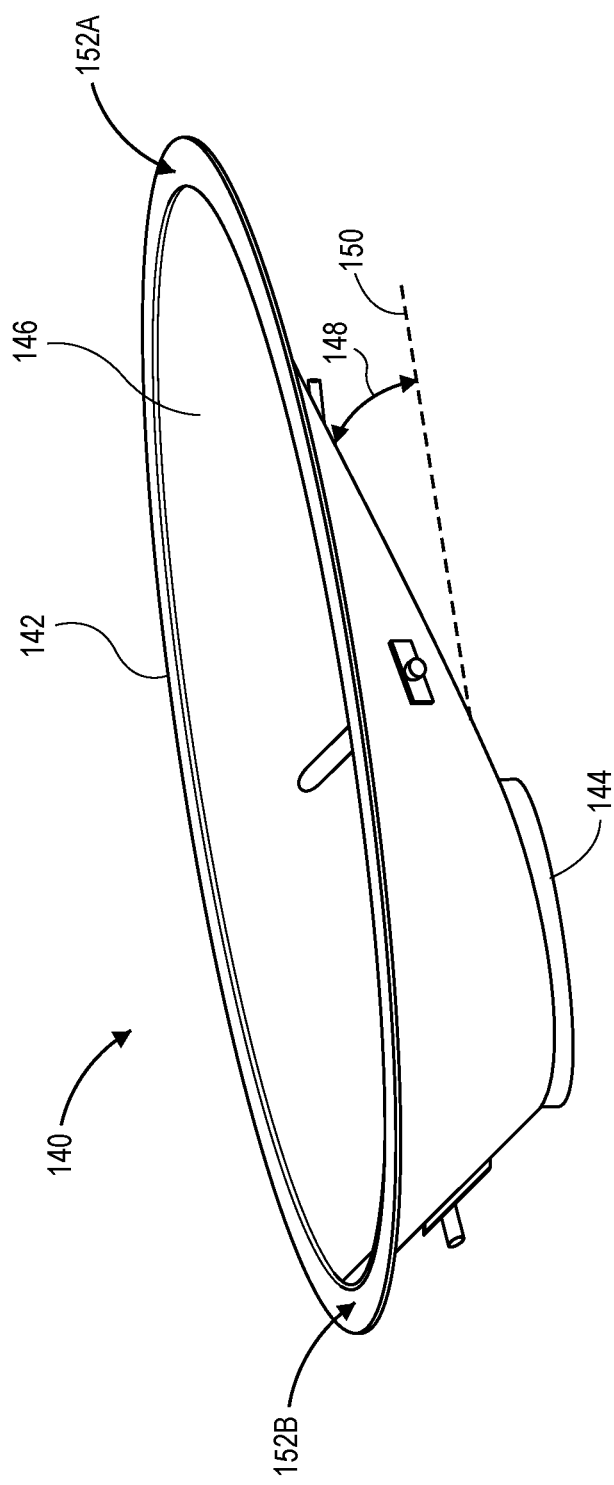
FIG. 6 illustrates a perspective view of the pan of the upper frame assembly, according to an embodiment.

FIG. 6 illustrates a perspective view of the pan 140, according to an embodiment. As mentioned above, the pan 140 may be or include an offset configuration whereby the lower opening 144 is not concentric with the upper opening 142. As a result, an angle 148 of the inner surface 146 of the pan 140 with respect to a horizontal plane 150 may vary around the circumference of the pan 140. The horizontal plane 150 may be parallel and/or coplanar with the upper opening 142 and/or the lower opening 144. For example, the angle 148 at a first circumferential location 152A (e.g., the smallest angle) may be from about 3° to about 30°, about 3° to about 20°, or about 3° to about 10°. The angle 148 at a second circumferential location 152B (e.g., the largest angle) may be from about 30° to about 85°, about 45° to about 85°, or about 60° to about 85°. Having the pan 140 in this shape may allow the pan 140 to fit within the inner frame wall 122 (e.g., because the inner frame wall 122 and the upper opening 142 of the pan 140 are substantially the same shape and size). In addition, this shape may also reduce the distance that the smaller objects fall onto the sloped tray 191, as described above.

Figure 7:
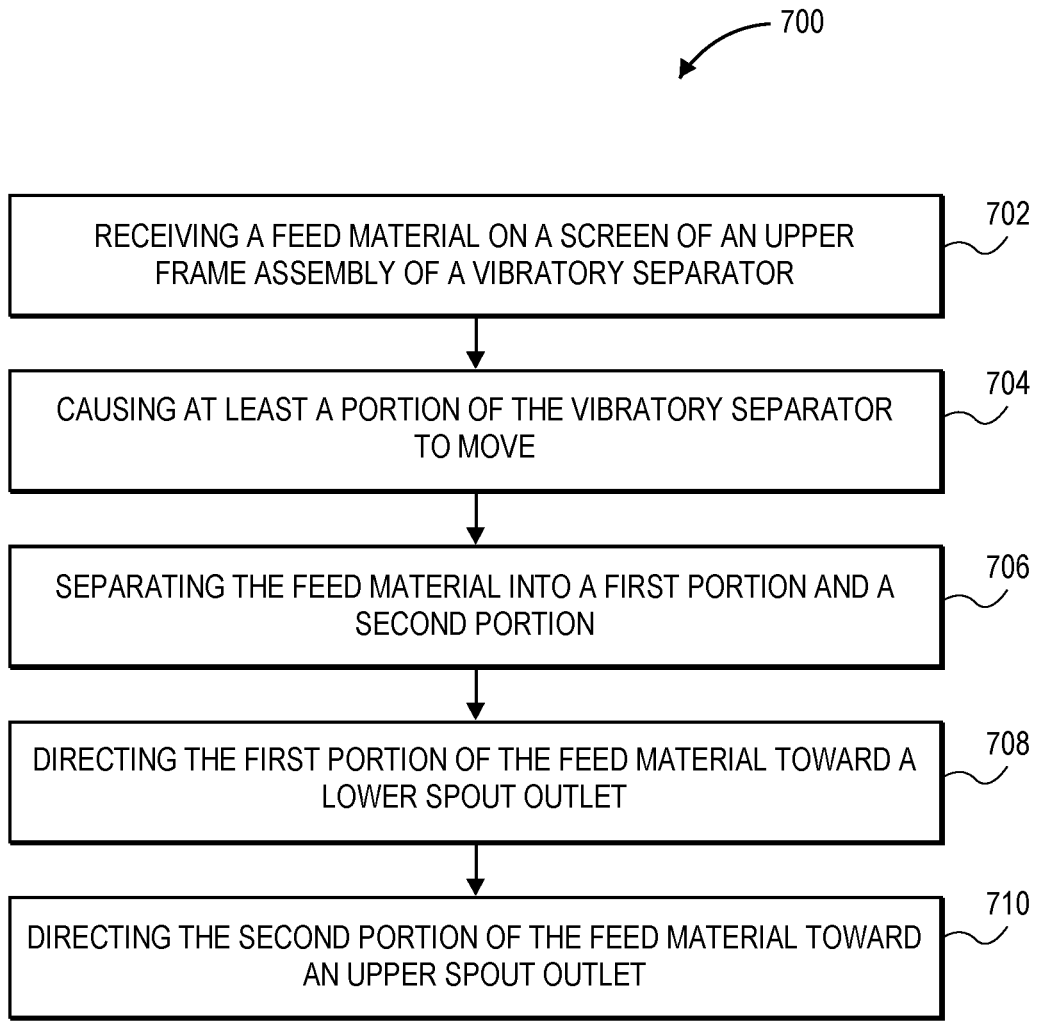
FIG. 7 illustrates a flowchart of a method for using the vibratory separator, according to an embodiment.

FIG. 7 illustrates a flowchart of a method 700 for using the vibratory separator 100, according to an embodiment. An illustrative order of the method 700 is described below; however, it will be appreciated that one or more portions of the method 700 may be performed in a different order or omitted.

The method 700 may include receiving the feed material on (e.g., a center portion of) the screen 130 of the upper frame assembly 120A. In this particular example, the feed material may be chips (e.g., potato chips); however, as mentioned above, the feed material may be or include any material that is to be separated by size. The feed material may be received at a rate from about 5-25 cubic feet per minute.

The method 700 may also include causing at least a portion of the vibratory separator 100 to move, as at 704. The movement may be or include vibratory motion generated by the motion generator 194. The vibratory motion may be imparted to the screen 130, the pan 140, the ramp 160, the sloped tray 191, the feed material, or a combination thereof. The vibratory motion may cause the feed material to move (e.g., radially outward) on the screen 130. The dome-shape of the screen 130 caused by crowning the screen center support 136 in the upper frame assembly 120A may also cause the feed material to move (e.g., radially outward) on the screen 130, as the screen 130 slopes downward proceeding radially outward.

The method 700 may also include separating the feed material into a first portion and a second portion, as at 706. The first portion of the feed material may include the liquid and small objects that pass through the openings in the screen 130, and the second portion of the feed material may include the large objects that do not pass through the screen 130. The vibratory motion and/or the dome-shape may facilitate the separation.

The method 700 may also include directing the first portion of the feed material toward the (lower) spout outlet 114, as at 708. More particularly, after passing through the screen 130, the first portion of the feed material may fall into the pan 140. The first portion of the feed material may then slide down the sloped inner surface 146 of the pan 140. The pan 140 may extend downward through the ramp 160. The first portion of the feed material may fall through the lower opening 144 of the pan 140 onto the sloped tray 191 of the lower frame assembly 120B and flow out of the lower frame assembly 120B via the lower spout outlet 114.

The method 700 may also include directing the second portion of the feed material toward the (upper) spout outlet 116, as at 710. More particularly, the second portion of the feed material may fall over the outer edge 132 of the screen 130 around the entire circumference of the screen 130. The second portion of the feed material may fall into the channel 166 and land on the ramp 160. The second portion of the feed material may then slide down the ramp 160 (e.g., via the first path 178A and/or the second path 178B) toward the upper spout outlet 116.

As described above, the vibratory separator 100 may be substantially round (e.g., circular) and be able to process (e.g., separate) feed materials that are mostly large objects, mostly small objects, or anywhere in between (e.g., 50% large objects and 50% small objects). When the feed material includes potato chips, the shape and size of the potato chips may vary based at least partially upon the location where the potatoes are grown and the time of the year that the potatoes are harvested. As a result, the potato chips that are introduced into the vibratory separator 100 may sometimes be mostly large (where most of the potato chips will not pass through the screen 130), and other times, they may be mostly small (where most of the potato chips pass through the screen 130). Due to the dome-shaped screen 130, the vibration of the screen 130, and the 360 degree discharge path into the channel 166, the vibratory separator 130 may be able to process (e.g., separate) the potato chips better than conventional separators. Conventional vibratory separators may become clogged if the composition of the feed material changes from mostly small objects to mostly large objects, or vice versa, unless a user intervenes and manually replaces a portion of the vibratory separator.

Moreover, the objects (e.g., potato chips) may be sticky and/or oily. For example, the potato chips may have seasoning thereon makes them stickier than they would otherwise be. One or more portions of the vibratory separator 100 may include a coating (e.g. a polish) that may keep the objects flowing through the vibratory separator 100 at the desired rate and thus reducing object buildup within the vibratory separator 100 that may result from the objects being sticky/oily. The polish may be or include number 7 polish, number 8 polish, or a combination thereof. For example, the polish may range from about 4-12 RA micro-inches or from about 3-7 RA micro-inches. The polish may be applied to the inner frame wall 122, the outer frame wall 124, the inner surface 146 of the pan 140, the ramp 160, the sloped tray 191, or a combination thereof.

In addition, the vibratory separator 100 may operate at lower speeds than conventional round vibratory separators. The vibratory separator 100 may be able to operate at lower speeds due at least in part to the ability to discharge materials off of the screen 130 around the entire circumference of the screen 130 with no restriction. The vibratory separator 100 may also or instead be able to operate at lower speeds due to the short distance between the center portion of the screen 130 to the outer edge 132 of the screen 130. In an example, the vibratory separator 100 may be able to operate at lower speeds produced by standard electrical supply frequencies of 60 hertz (HZ) with a 6 pole motor (e.g., at 1200 RPM) and/or 50 HZ with a 4 pole motor (e.g., at 1500 RPM). Operating speed can decrease to speeds from about 750-1000 RPM at 50 HZ or about 900-1200 RPM at 60 HZ, either by changing the number of poles in the motor or using an electric frequency inverter. At speeds lower than 1500 RPM at 50 HZ or 1200 RPM at 60 HZ, the G-force experienced due to the motion (e.g., vibration) may be from about 1 to about 5. Due to the lower speeds and/or the lower G-force, the maximum amplitude (e.g., stroke length) of the vibratory separator 100 may increase to higher levels ranging from 0.125 inch to about 0.625 inch. The higher amplitude may be or include the horizontal amplitude, the vertical amplitude, or both.

In contrast, conventional round vibratory separators operate at higher speeds. For example, conventional round vibratory separators operate at a speed of about 1200-1500 RPM. At 1200-1500 RPM, the maximum vibration amplitude of conventional round vibratory separators is limited to about 0.25 inch at 1200 RPM and to about 0.16 inch at 1500 RPM, as higher amplitude (e.g., stroke length) generates higher G force on the separator structure which can cause cracking and failure of the separator.

Because the vibratory separator 100 may have a larger amplitude than conventional vibratory separators, the vibratory separator 100 may be configured to receive and process higher capacities (e.g., volumetric flow rates) of feed materials. In addition, because the vibratory separator 100 may have a lower speed and/or a lower G-force, the components of the vibratory separator may experience less stress than the components of conventional vibratory separators.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. They are not intended to be exhaustive of or to limit this disclosure to the precise forms described. Many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the claims and their equivalents below.

What is claimed is:

1. A frame assembly for a vibratory separator, the frame assembly comprising:
   a screen;
   a pan positioned at least partially below the screen, wherein the pan defines an upper opening and a lower opening, wherein the upper opening is larger than the lower opening, wherein the lower opening has a different center point than the upper opening, and wherein the pan comprises an inner surface extending from and sloping radially inward and downward from the upper opening to the lower opening; and
   a ramp positioned at least partially below the screen and at least partially around the pan, wherein the ramp defines an opening therethrough, wherein the pan extends at least partially through the opening of the ramp, and wherein the ramp is tilted with respect to horizontal.

2. The frame assembly of claim 1, wherein the ramp is tilted at an angle from about 5° to about 30° with respect to horizontal such that the ramp comprises an upper side and a lower side.

3. The frame assembly of claim 2, further comprising an inner frame wall and an outer frame wall, wherein the ramp is positioned between the inner frame wall and the outer frame wall, and wherein the inner frame wall, the ramp, and the outer frame wall at least partially define a channel.

4. The frame assembly of claim 3, wherein the channel defines a first path and a second path from the upper side of the ramp to the lower side of the ramp, and wherein the first path and the second path extend around opposing sides of the inner frame wall.

5. The frame assembly of claim 4, wherein a depth of the channel varies proceeding through the first path and the second path.

6. The frame assembly of claim 5, wherein the depth increases proceeding radially outward toward the outer frame wall proximate to the lower side of the ramp.

7. The frame assembly of claim 5, wherein the depth decreases proceeding radially outward toward the outer frame wall proximate to the upper side of the ramp.

8. The frame assembly of claim 4, wherein a width of the channel is substantially constant proceeding through the first path and the second path.

9. The frame assembly of claim 1, wherein the lower opening is positioned closer to the lower side of the ramp than the upper side of the ramp.

10. A vibratory separator, comprising:
    an upper frame assembly comprising:
       a screen configured to receive a feed material, wherein a first portion of the feed material passes through the screen, and wherein a second portion of the feed material falls over an outer edge of the screen;
       a pan positioned at least partially below the screen, wherein the first portion of the feed material falls into the pan after passing through the screen, and wherein the first portion of the feed material exits the vibratory separator via a lower spout outlet subsequent to falling into the pan;
       a ramp positioned at least partially below the screen and at least partially around the pan, wherein the ramp defines an opening therethrough, wherein the pan extends at least partially through the opening of the ramp, and wherein the ramp is tilted at an angle from about 5° to about 30° with respect to the outer edge of the screen such that the ramp comprises an upper side and a lower side;
       an inner frame wall positioned radially outward from the pan;
       an outer frame wall positioned radially outward from the screen, the pan, the ramp, and the inner wall, wherein the inner frame wall, the ramp, and the outer wall at least partially define a channel, wherein the second portion of the feed material falls over the outer edge of the screen into the channel, and wherein the second portion of the feed material exits the vibratory separator via an upper spout outlet subsequent to falling into the channel;
    a lower frame assembly positioned below the upper frame assembly, wherein the lower frame assembly comprises a sloped tray below the pan, wherein the first portion of the feed material lands on the sloped tray and slides down the sloped tray toward the lower spout outlet; and
    a motion generator configured to impart motion to the upper frame assembly and the lower frame assembly, wherein the pan defines an upper opening and a lower opening, wherein the upper opening is larger than the lower opening, wherein the lower opening has a different center point than the upper opening, and wherein the lower opening is positioned closer to an upper side of the sloped tray of the lower frame assembly than a lower side of the sloped tray of the lower frame assembly to minimize a distance that the first portion of the feed material falls.

11. The vibratory separator of claim 10, wherein the channel defines a first path and a second path from the upper side of the ramp to the lower side of the ramp, and wherein the first path and the second path extend around opposing sides of the inner frame wall.

12. The vibratory separator of claim 11, wherein a depth of the channel varies proceeding along the first path, the second path, or both.

13. A method for using a vibratory separator, comprising:
receiving a feed material on a screen of an upper frame assembly;
separating the feed material into a first portion and a second portion, wherein the first portion falls through the screen into a pan, and wherein the second portion falls over an outer edge of the screen onto a ramp, wherein the ramp defines an opening therethrough, wherein the pan extends at least partially through the opening of the ramp, and wherein the ramp is tilted with respect to horizontal;
directing the first portion toward a first spout outlet subsequent to falling into the pan; and
directing the second portion toward a second spout outlet subsequent to falling onto the ramp,
wherein the pan defines an upper opening and a lower opening, wherein the upper opening is larger than the lower opening, wherein the lower opening has a different center point than the upper opening, and wherein the pan comprises an inner surface extending from and sloping radially inward and downward from the upper opening to the lower opening.

14. The method of claim 13, wherein the ramp is tilted at an angle from about 5° to about 30° with respect to horizontal such that the ramp comprises an upper side and a lower side, wherein the ramp is positioned radially between an inner frame wall and an outer frame wall, wherein the inner frame wall, the ramp, and the outer frame wall at least partially define a channel, wherein the channel defines a first path and a second path from the upper side of the ramp to the lower side of the ramp, and wherein the first path and the second path extend around opposing sides of the inner frame wall.

15. The method of claim 14, wherein the lower opening is positioned closer to the lower side of the ramp than the upper side of the ramp.

16. The method of claim 15, wherein directing the first portion toward the first spout outlet comprises directing the first portion from the pan onto a sloped tray positioned below the pan, wherein the lower opening of the pan is positioned closer to an upper side of the sloped tray than a lower side of the sloped tray.

17. The method of claim 16, further comprising causing at least a portion of the vibratory separator to vibrate.

* * * * *